Sept. 6, 1960
S. G. FONG
2,951,944
RADIATION SENSITIVE DEVICE
Filed March 10, 1958
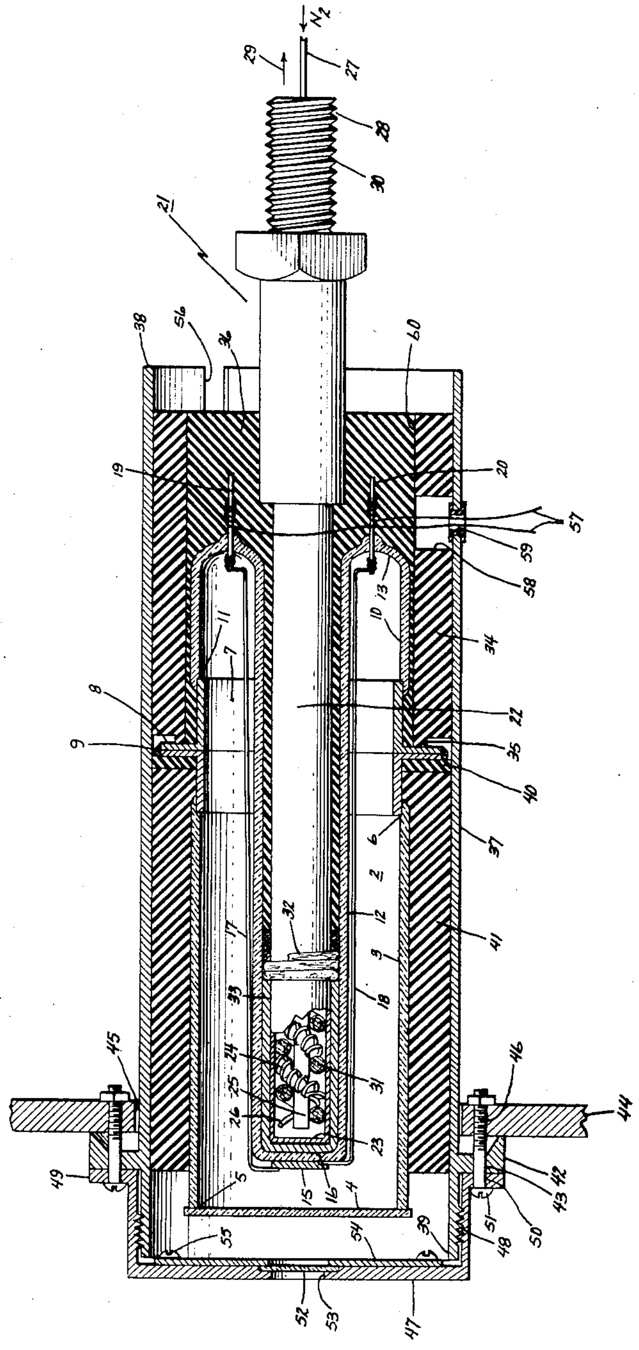
Inventor:
Samuel G. Fong,
by Lust & Irish
Attorneys United States Patent Office 2,951,944
Patented Sept. 6, 1960

2,951,944

RADIATION SENSITIVE DEVICE

Samuel G. Fong, Fort Wayne, Ind., assignor to International Telephone and Telegraph Corporation Filed Mar. 10, 1958, Ser. No. 720,499

5 Claims. (Cl. 250—83.3)

This invention relates to radiation sensitive devices, such as infrared detectors, and more particularly to the assembly of a radiation sensitive device of the type including a radiation sensitive cell and a low temperature cooling device.

A conventional type of infrared (I.R.) detector includes an evacuated generally tubular envelope with a transparent window at one end and with reentrant tubular portion formed from the other end and extending toward the window; the I.R.-sensitive cell, such as a lead telluride (PbTe) cell, is positioned within the envelope on the end of the reentrant portion and in registry with the transparent window. In order to provide greatest sensitivity to infrared radiation, it is necessary that the cell be operated at an extremely low ambient temperature and therefore, in such conventional I.R. detectors, a Joule-Thomson effect cooling device, commonly referred to as a "cryostat," is conventionally provided extending into the reentrant tubular portion of the envelope. The Joule-Thomson effect cooling device conventionally comprises an elongated thin-wall metal jacket having a closed end with a convolute capillary tube arranged within the jacket and with its discharge or nozzle end positioned adjacent the closed end of the jacket; high pressure nitrogen is supplied to the capillary tube and when discharged through the nozzle, flows upwardly over the convolutions of the tube for ultimate low pressure discharge from the jacket at the end opposite from the closed end thereof. The device therefore provides cooling, not only due to expansion of the gas on discharge from the nozzle of the capillary tube, but also by virtue of the heat exchange action of the gas flowing over the convolutions of the capillary tubing and temperatures as low as —196° C. are obtainable with devices of this type.

In the past, the Joule-Thomson effect cooling device has been held in place within the reentrant tubular portion of the envelope of the I.R. detector by means of a mechanical support at its base or low pressure end. In order to operate the I.R. detector in a system where maximum signal-to-noise performance is desired, it is most important that a minimum amount of noise be provided in the output signal due to microphonics and contact leakage. Tests conducted on prior I.R. detector cells with the above described Joule-Thomson effect cooling device mounting have indicated that the cooling device is the major source of noise within the system with contact leakage being another source of noise. The noise attributable to the cooling device is due to the turbulence of the gas expansion within the metal jacket which creates vibration of the coiled capillary tube assembly thus causing a microphonic noise of fairly high frequency and furthermore, the entire cooling device assembly tends to deflect about the support at its base and raps against the wall of the reentrant tubular portion of the envelope at a lower frequency. It has further been found that another source of noise in the device is produced by the formation of condensation around the external terminals of the device after extended operation, thus creating a lower resistance path between the external terminals or pins. All of the above described disturbances are random in nature and it has been found that they cannot be completely eliminated by conventional electronic filter circuits.

It is therefore desirable to provide a radiation sensitive detector assembly of the type here under discussion in which the noise due to microphonics caused by the cooling device and due to contact leakage encountered in prior radiation sensitive devices of this type is substantially eliminated. In accordance with my invention, therefore, I have provided a radiation sensitive device in which the Joule-Thomson effect cooling device is retained and positioned within the reentrant tubular portion of the envelope by a mass of solidified potting compound, a gasket member arranged around the metal jacket of the cooling device a relatively short distance from its closed end and engaging the wall of the reentrant tubular portion of the envelope further preventing the jacket of the cooling device from contacting the envelope and also serving as a barrier to prevent the potting compound from filling the bottom extremity of the cavity defined by the metal jacket and the reentrant tubular portion; the extreme low temperature encountered adjacent the closed end of the metal jacket of the cooling device and the extreme range of temperature change encountered would have a deleterious effect on the potting compound. The potting compound further surrounds and encases the terminal pins of the device thus reducing the contact leakage which was previously encountered. Finally, the microphonic noise due to vibration of the capillary tube within the metal jacket due to turbulence of the gas expansion is, in the preferred embodiment of my invention, eliminated by winding a lint-free cord, such as nylon, in the convolutions of the capillary tubing, the cord engaging the inner wall of the metal jacket thus preventing the tubing from contacting the wall and also from mechanically vibrating. Finally, the envelope itself is supported within an outer tubular metal housing by a mass of solidified potting compound thus preventing vibration of the entire assembly with accompanying microphonics and providing magnetic shielding for the device. The outer housing further has mounting means arranged on its outer periphery so that the device is secured in a mounting plane adjacent the I.R. cell.

It is therefore an object of my invention to provide an improved assembly for a radiation sensitive device of the type incorporating a radiation sensitive cell and a cooling device.

Another object of this invention is to provide an improved radiation sensitive device of the type heretofore described in which noise due to microphonics and contact leakage encountered in prior devices known to the applicant is substantially eliminated.

The above-mentioned and other features and objects of this invention and the manner of attaining them will become more apparent and the invention itself will be best understood by reference to the following description of an embodiment of the invention taken in conjunction with the accompanying drawings, wherein the single figure of the drawing is a view, partly in section and partly broken away, illustrating the improved radiation sensitive device of my invention.

Referring now to the drawing, my improved radiation sensitive device assembly, generally identified as 1, which may be an I.R. detector, comprises an evacuated generally tubular envelope 2 having a first tubular portion 3, conventionally formed of glass, with a transparent window 4, for instance a sapphire window, being sealed to one end thereof, as at 5. The other end 6 of the tubular portion 3 is sealed to a tubular metal portion 7 which has a radially outwardly extending annular flange portion 8 formed on its outer surface, intermediate its two ends;

tubular portion 7 may conveniently be constructed of two annular portions each having an annular flange portion formed at one end, the flange portions being arranged abutting as shown with their outer peripheral edges being welded together, as at 9.

A third tubular portion 10 is provided, again conventionally formed of glass, having one end 11 sealed to the end of the metal tubular portion 7, remote from the first tubular portion 3, and having a reentrant tubular portion 12 in registry with window 4 formed from its other end 13. A suitable radiation sensitive cell 15, such as a lead telluride cell, is arranged on the inner surface of the end wall 16 of the reentrant tubular portion 12 with suitable electrical leads 17 and 18 being respectively connected thereto; leads 17 and 18 extend from the cell 15 toward the opposite end 13 of the envelope 2 and are secured to terminal pins 19 and 20 which extend through end 13 of the tubular portion 10 of envelope 2.

A Joule-Thomson effect cooling device 21 is provided having an elongated thin-wall metal jacket 22 with its end 23 closed as shown. A coiled-coil capillary tube 24 is positioned in the jacket 22 about mandril 25 with its nozzle or discharge end 26 adjacent the closed end 23 of the thin-wall jacket member 22 and with its other end 27 extending out of the jacket member 22 and adapted to be connected to a source of high pressure nitrogen (not shown); the high pressure nitrogen fed to the capillary tube 24 is discharged through the nozzle 26 and expands over the coiled-coil convolutions of the tube 24 being finally exhausted, generally at atmospheric pressure, through the other end 28 of the tube 22, as shown by the arrow 29. It will be readily understood that a conventional fitting 30 is shown for connecting the Joule-Thomson cooling device 21 to the source of high pressure nitrogen and to a suitable exhaust therefor.

In order to prevent the turbulence of the expanding nitrogen gas within the thin-wall metal jacket 22 from causing the capillary tube to vibrate and strike the inner wall of the jacket 22 thus causing microphonics, a lint free cord or thread 31, such as nylon, having a diameter slightly larger than the pitch depth of the helical coil defined by the capillary tube 24 is wrapped or wound in the convolutions of the capillary tube 24 so that when the capillary tube and mandril assembly is inserted in the jacket 22, the cord 31 engages the inner wall of the jacket 22. The cord 31 thus eliminates any possible metal-to-metal contact between the capillary tube 24 and the metal jacket 22, further providing a tight fit between the two assemblies and thus substantially eliminating the high frequency vibrations previously encountered due to turbulence of the expanding gas.

A suitable gasket 32, which may be formed of several turns of woolen yarn or cord wound around a short section of the outer surface of the jacket 22 and spaced from the closed end 23 is provided. The cavity defined by the jacket 22 and the tubular envelope portion 12 between the gasket 32 and the end 16 of the reentrant tubular envelope portion 12 is conventionally filled with a conductive grease 33, which may be a mixture of silicone grease and copper dust. The gasket 32 thus retains the conductive grease 33 in its desired location and since it is in tight engagement with the surface of the reentrant tubular envelope portion 12, it also eliminates any possible metal-to-glass contact between the jacket 22 of the cooling device 21 and the reentrant tubular envelope portion 12; the gasket 32 additionally performs a further function which will be hereinafter more fully described.

A tubular member 34 formed of suitable insulating material, such as Bakelite, is provided having one end 35 abutting the annular flange portion 8 of the tubular metal member 7 and extending beyond the contact pins 9 as shown; tubular member 34 has its inner surface 60 spaced from the outer surface of the third tubular portion 10 as shown. The cavity defined by the tubular insulating member 34 is filled with a mass of solidified potting compound 36 and it will be seen that the potting compound 36 fills the space between the tubular insulating member 34 and the outer surfaces of tubular envelope members 7 and 10 and also between the reentrant tubular envelope portion 12 and the jacket 22 of the cooling device 21 down to the gasket 32. It will now be seen that the gasket 32 isolates the potting compound 36 from the extremely cold end of the jacket 22 adjacent the closed end 23; it is obvious that the potting compound 36 would be deleteriously affected not only by the extremely cold temperature adjacent the closed end 23 of jacket 22, but also by the extremely wide range of temperature variation. The potting compound 36 is preferably one having extremely high resistivity, such as an epoxy resin and also preferably has good heat conductivity. It will now be readily seen that the encapsulation of the cooling device 21 by the solidified potting compound 36 forms an integral assembly with the envelope 2 thus substantially eliminating any further tendency of the cooling device 21 to vibrate within the reentrant envelope portion 12. In addition, it will be observed that the terminal pins 19 and 20 are encapsulated in the potting compound 36 thus reducing the tendency for contact leakage previously encountered.

An outer tubular metal housing member 37 is provided tightly engaging the outer surface of the tubular insulating member 34 and having one end 38 extending beyond the tubular member 34 and the potting compound 36 and its other end 39 extending axially beyond window 4 as shown. A resilient gasket member 40 is provided positioned abutting annular flange 8 of tubular metal envelope portion 7 on the side thereof remote from the tubular insulating member 34, gasket member 40 being formed of any suitable resilient material, such as rubber or neoprene, and having an outside diameter slightly larger than the inside diameter of the outer tubular housing member 37 and an inside diameter slightly smaller than the outside diameter of the tubular metal envelope portion 7, thus effectively forming a seal. Another mass 41 of solidified potting compound fills the cavity defined by tubular envelope portion 3 and the outer tubular housing member 37 between the gasket 40 and a point slightly short of the window 4 as shown. It will be readily seen that the outer metal jacket 37, which is preferably formed of steel, forms a magnetic shield against unwanted electromagnetic radiation pick-up; the I.R. cell is quite susceptible to magnetic influence. In addition, the encapsulation of the tubular envelope portion 3 by the potting compound 41 in combination with the encapsulation provided by the mass of potting compound 36 encases all of the fragile components of the assembly, thus permitting ease of handling of the device.

An annular mounting flange 42 is provided on the outer surface of the tubular metal housing member 37 adjacent its end 39, flange 42 being provided with a plurality of radially spaced openings 43 therethrough. Mounting flange 42 may be arranged abutting a mounting panel 44 having a suitable opening 45 formed therein in which the outer housing 37 is positioned as shown; panel 44 likewise has a cooperating plurality of radially spaced openings 46 formed therein.

A cover member 47 is provided threadingly engaging end 39 of the tubular housing member 37, as at 48 and having an annular flange portion 49 abutting the side of annular flange portion 42 remote from mounting panel 44 as shown. Flange portion 49 on cover 47 has a plurality of radially spaced openings 50 formed therein with suitable bolts 51 extending through the openings 50, 43 and 46 as shown, thereby to hold the cover member 47 in position and in turn to hold the detector assembly 1 in the opening 45 in the mounting panel 44. A suitable filter, such as an I.R. filter 52 may be retained in opening 53 in the cover member 47 by a suitable retaining plate 54 secured to the inner surface of the cover member 47 in any suitable manner, as by screws 55.

Since orientation of the I.R. detector 15 with respect to the source of infrared radiation is important, the envelope and I.R. cell assembly 2, 15 may be located within the outer housing member 37 in a prearranged manner with a housing member 37 in turn having suitable indexing means, such as slot 56. External leads 59 are secured to pins 19 and extend through openings 58 in members 34 and 59 in housing 37.

It will now be seen that I have provided a radiation detecting device with the accompanying cooling apparatus completely embedded therein, thereby minimizing their relative physical displacement and accompanying microphonics, the entire assembly being in turn embedded within a magnetic shield and protective housing. It has been found that construction of an I.R. detector in accordance with my invention has provided a reduction of microphonic noise to improve the signal-to-noise ratio by more than 3:1, thus effectively extending the range of the I.R. equipment.

While I have described above the principles of my invention in connection with specific apparatus, it is to be clearly understood that this description is made only by way of example and not as a limitation to the scope of my invention.

What is claimed is:

1. A radiation sensitive device comprising: an evacuated tubular envelope having a transparent window portion at one end and a reentrant tubular portion formed from the other end; a radiation sensitive cell disposed in said envelope on the inner surface of the end wall of said reentrant tubular portion; electrical leads connected to said cell and having portions extending out of said envelope; a cooling device having an elongated portion extending into said reentrant tubular envelope portion; an outer tubular housing member concentrically arranged about said envelope and spaced therefrom; and a mass of solidified insulating material filling the cavity defined by said envelope and said housing member, said insulating material encasing a portion of said cooling device and said external electrical lead portions thereby supporting said cooling device and preventing mechanical vibration of the same with respect to said envelope whereby noise due to microphonics is prevented.

2. A radiation sensitive device comprising: an evacuated tubular envelope with a transparent window portion at one end and a reentrant tubular portion formed from the other end; a radiation sensitive cell disposed in said envelope on the inner surface of the end wall of said reentrant tubular portion; electrical leads connected to said cell and having portions extending out of said other end of said envelope; a Joule-Thomson effect cooling device having an elongated thin-wall metal tube with one end thereof closed, said metal tube extending into said reentrant tubular portion of said envelope with its closed end being disposed adjacent the end of said reentrant envelope portion; gasket means surrounding a section of said metal tube spaced from said closed end thereof and engaging said reentrant tubular portion thereby to prevent contact of said metal tube therewith; an outer tubular metal housing member concentrically surrounding said envelope and spaced therefrom, said housing member extending beyond the ends of said envelope; and a mass of solidified insulating material filling the cavity defined by said envelope and said housing member, said insulating material encasing said cooling device and said electrical lead extension portions and filling the space defined between said metal tube of said cooling device and said reentrant envelope portion to said gasket member thereby supporting said cooling device integrally with said envelope preventing relative movement with respect thereto whereby noise due to microphonics is eliminated, said insulating material further preventing leakage between said electrical lead extension portions.

3. A radiation sensitive device comprising: an evacuated tubular envelope with a transparent window portion at one end and a reentrant tubular portion formed from the other end; a radiation sensitive cell disposed in said envelope on the inner surface of the end wall of said reentrant tubular portion; electrical leads connected to said cell and having portions extending out of said other end of said envelope; a Joule-Thomson effect cooling device having an elongated thin-wall metal tube with one end thereof closed, a convolute capillary tube disposed in said metal tube and having an open end disposed adjacent said closed end of said metal tube, and means spacing said capillary tube from the inner wall of said metal tube thereby to prevent contact of said capillary tube therewith; said metal tube of said cooling device extending into said reentrant tubular portion of said envelope with its closed end positioned adjacent said end wall thereof; gasket means surrounding a section of said metal tube spaced from said closed end thereof and engaging said reentrant tubular portion thereby to prevent contact of said metal tube therewith; an outer tubular metal housing member concentrically surrounding said envelope and spaced therefrom, said housing member extending beyond the ends of said envelope; and a mass of solidified insulating material filling the cavity defined by said envelope and said housing member, said insulating material encasing said cooling device and said electrical lead extension portions and filling the space defined between said metal tube of said cooling device and said reentrant envelope portion to said gasket member thereby supporting said cooling device integrally with said envelope preventing relative movement with respect thereto whereby noise due to microphonics is eliminated, said insulating material further preventing leakage between said electrical lead extension portions.

4. A radiation sensitive device comprising: an evacuated tubular envelope with a transparent window portion at one end and a reentrant tubular portion formed from the other end; said envelope having an annular flange portion formed on its outer surface intermediate said ends thereof; a radiation sensitive cell disposed in said envelope on the inner surface of the end wall of said reentrant tubular portions; electrical leads connected to said cell and having portions extending out of said other end of said envelope; a Joule-Thomson effect cooling device having an elongated thin wall metal tube with one end thereof closed, a coiled-coil capillary tube disposed in said metal tube and having an open end disposed adjacent said closed end of said metal tube, and a lint-free cord disposed in the convolutions of said capillary tube and engaging the inner wall of said metal tube thereby to prevent contact of said capillary tube therewith; said metal tube of said cooling device extending into said reentrant tubular portion of said envelope with its closed end adjacent said end wall thereof; gasket means surrounding a section of said metal tube spaced from said closed end and engaging said reentrant tubular portion thereby to prevent contact of said metal tube therewith; a tubular insulating member surrounding said other end of said envelope having one end abutting said annular flange and its other end extending axially beyond said electrical lead extensions but terminating short of the end of said metal tube of said cooling device; a mass of solidified high resistivity potting compound filling the cavity defined by said tubular insulating member surrounding said electrical lead extension portions and extending into the space between said metal tube and said reentrant tubular portion terminating at said gasket member; an outer tubular metal jacket having one end embracing said tubular insulating member and its other end extending axially adjacent said window and coaxially surrounding said envelope; and a mass of solidified potting compound filling the cavity defined by said envelope and said outer jacket.

5. A radiation sensitive device comprising: an evacuated envelope having a first tubular glass portion, a transparent window sealed to one end of said first tubular portion, a tubular metal portion having one end sealed to the other end of said first tubular portion and forming a continuation thereof, and a second tubular glass portion having one end sealed to the other end of said tubular metal portion and forming a continuation thereof, said second tubular portion having a tubular reentrant portion formed from its other end and extending into said first tubular portion with its end wall closely spaced from said window, said tubular metal portion having an annular flange portion formed on its outer wall intermediate its ends; a radiation sensitive cell positioned in said envelope on the inner surface of the end wall of said reentrant portion and in registry with said window; electrical leads connected to said cell and having portions extending out of said envelope through said other end of said second tubular portion; a Joule-Thomson effect cooling device having an elongated thin-wall metal tube with one end thereof closed, a coiled-coil capillary tube disposed in said metal tube and having an open end disposed adjacent said closed end of said metal tube and a nylon cord wound in the convolutions of said capillary tube and having a diameter greater than the pitch depth of said coiled-coil tube, said cord engaging the inner wall of said tube thereby to prevent contact of said capillary tube therewith; said metal tube of said cooling device extending into said reentrant tubular portion of said envelope and spaced from the side wall thereof with its closed end adjacent the outer surface of said end wall; a woolen cord wound around a section of the outer periphery of said metal tube of said cooling device spaced from said closed end, said woolen cord engaging the side wall of said reentrant tubular portion of said envelope thereby preventing contact of said metal tube with said reentrant tubular portion; a tubular member formed of insulating material having one end engaging one side of said annular flange portion of said tubular metal portion of said envelope, said tubular insulating member coaxially surrounding said second tubular portion and exending axially beyond said electrical lead extension portions, said metal tube of said cooling device extending beyond the other end of said tubular insulating member, said tubular insulating member having its inner surface spaced from the outer surface of said second tubular portion of said envelope; a mass of high resistivity solidified potting compound filling the cavity defined by said tubular insulating member surrounding said electrical lead extension portions and extending into the spaces between said metal tube of said cooling device and said reentrant tubular portion and between said second tubular portion of said envelope and said tubular insulating member, said woolen cord serving as a gasket to prevent entry of said potting compound into the space adjacent the closed end of said metal tube; an outer tubular metal jacket embracing the outer surface of said tubular insulating member and having one end extending axially beyond said envelope window, said outer jacket having its inner surface spaced from the outer surface of said first tubular portion, said outer jacket having an annular mounting flange formed on its outer surface adjacent said one end; a resilient gasket embracing said tubular metal portion of said envelope and abutting said annular flange portion on the side thereof remote from said tubular insulating member, said resilient gasket engaging the inner surface of said jacket member; a mass of solidified potting compound filling the cavity defined by said outer jacket and said first tubular envelope portion and said gasket and terminating short of said envelope window; and a closure member having a light filter disposed therein in registry with said window and cell removably secured to said one end of said outer jacket member.

References Cited in the file of this patent

UNITED STATES PATENTS

| | | |
|---|---|---|
| 2,839,645 | Hester | June 17, 1958 |
| 2,858,398 | Rocard et al. | Oct. 28, 1958 |